United States Patent [19]

Tahara

[11] Patent Number: 4,857,858
[45] Date of Patent: Aug. 15, 1989

[54] DIGITAL DEMODULATION SYSTEM HAVING INDEPENDENTLY OPERATING CROSS-POLARIZATION CANCELLERS

[75] Inventor: Masato Tahara, Tokyo, Japan

[73] Assignee: NEC Corporation, Japan

[21] Appl. No.: 186,285

[22] Filed: Apr. 26, 1988

[30] Foreign Application Priority Data

Apr. 30, 1987 [JP] Japan .............................. 62-106933

[51] Int. Cl.$^4$ ............................................. H04B 1/10
[52] U.S. Cl. ...................................... 329/50; 329/109; 329/135; 375/102
[58] Field of Search ................. 329/50, 104, 107, 109, 329/110, 112, 122, 124, 135, 146; 375/11, 39, 80, 82, 86, 94, 96, 99, 100, 101, 102, 103

[56] References Cited

U.S. PATENT DOCUMENTS 4,575,862  3/1986  Tahara et al. ..................... 455/296 X
4,688,235  8/1987  Tahara et al. ........................ 375/102

Primary Examiner—David Mis

Attorney, Agent, or Firm—Laff, Whitesel, Conte & Saret

[57] ABSTRACT

In a digital radio transmission in which first- and second-channel radio frequency digital signals are transmitted respectively on othogonally polarized radiowaves and first and second IF signals are derived respectively from the first- and second-channel RF signals. The second IF signal is proportioned in response to a control signal and subtractively combined with the first IF signal. A main digital demodulator provides demodulation on the combined IF signals to generate a main (N+1)-bit output and derives an N-bit data signal from N higher significant bits of the (N+1)-bit output and an error component from the LSB of the main (N+1)-bit output. An auxiliary digital demodulator provides demodulation of the second IF signal to generate an auxiliary (N+1)-bit output and derives a data component of the second channel from the MSB of the auxiliary (N+1)-bit output. The derived error and data components are supplied to a correlator to generate the control signal.

4 Claims, 2 Drawing Sheets

4,857,858

DIGITAL DEMODULATION SYSTEM HAVING INDEPENDENTLY OPERATING CROSS-POLARIZATION CANCELLERS

BACKGROUND OF THE INVENTION

The present invention relates generally to digital demodulation systems for demodulating intermediate frequency (IF) versions of radio frequency signals carried respectively on orthogonally oriented polarization planes, and more specifically to cancellation of interference between the polarization planes.

To achieve frequency utilization it has been a common practice to transmit two digital signals on respective channels formed by orthogonally oriented polarization planes, either vertical-horizontal or clockwise-counterclockwise orientation. However, fading and anisotropic nature of the transmission medium are the potential source of troubles, causing cross-polarization interference between the orthogonal planes. As shown and described in U.S. Pat. No. 4,575,862 issued to M. Tahara et al and assigned to the same assignee as the present invention and a paper "IF Band Cross-Polarization Canceler" by T. Ryu, M. Tahara and T. Noguchi, IEEE International Conference on Communications, Proceedings, Volume 2 May 14-17, 1984, Amsterdam, prior art cross-polarization cancellation involves the use of a single digital demodulator for each channel to process the intermediate frequency (IF) version of a radio frequency signal. The demodulator includes an (N+1)-bit analog-to-digital converter. The higher significant N bits of the (N+1)-bit output of the converter represent the original N-bit code and the LSB (least significant bit) of the (N+1)-bit converter output, which represents the cross-polarization interference, is supplied as an error component to a correlator of the own channel, while the MSB (most significant bit) of the (N+1)-bit converter output is cross-coupled to the correlator of the other channel as a data component. The correlator of each channel generates a control signal with which the amplitude of the IF signal of the other channel is proportioned and subtractively combined with the IF signal of the own channel, the combined IF signals being fed to the digital demodulator of the own channel to cancel the cross-polarization interference contained in the IF signal of the own channel. Since each demodulator forms part of the closed loop of the other channel, a modification of the operating parameters of one results in an alteration of the operating parameters of the other channel equipment.

SUMMARY OF THE INVENTION

It is therefore an object of the present invention to provide a cross-polarization digital demodulation system in which the modification of one channel has no effect on the other channel.

The digital demodulation system embodying the present invention is adapted for digital radio transmission in which first- and second-channel radio frequency digital signals are transmitted respectively on orthogonally polarized radiowaves and first and second intermediate frequency (IF) versions of the first- and second-channel radio frequency signals are derived. Each of these IF versions of the radio signals is applied to a variable coupler in which it is proportioned in amplitude in response to a control signal applied thereto and subtractively combined with the IF version of the other channel. Main and auxiliary digital demodulators are provided to recover the original N-level analog signals and derive (N+1)-bit outputs from these analog signals. The main demodulator provides demodulation on the output of the variable coupler and recovers the original N-bit information signal from the higher bits of its (N+1)-bit output and deriving an error component from the LSB of the (N+1)-bit output indicating the cross-polarization interference between the first- and second-channel radio frequency signals. The auxiliary digital demodulator provides demodulation on the IF version of the other channel to derive a data component from the MSB of its (N+1)-bit output. Correlation between the error component and the data component developed by the main and auxiliary demodulators is determined, and from this determination the control signal is generated to minimize the cross-polarization interference introduced to the own channel.

Due to the provision of the auxiliary digital demodulator, the closed loop interference cancellation of each channel operates independently from the other channel, and hence the present invention no longer suffers from the problems associated with the prior art system.

BRIEF DESCRIPTION OF THE DRAWINGS

The present invention will be described in further detail with reference to the accompanying drawings, in which.

DETAILED DESCRIPTION

Figure 1:
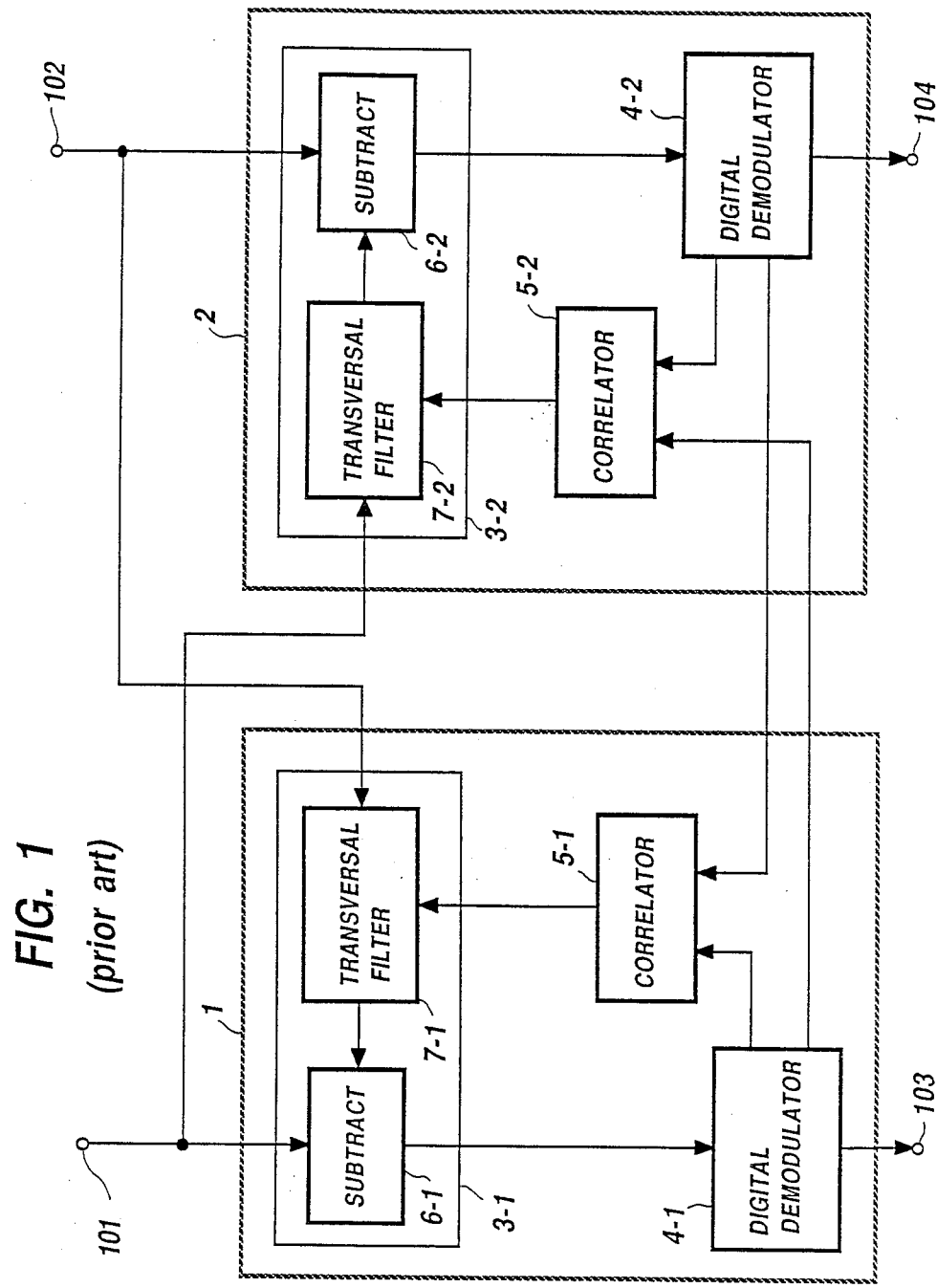
FIG. 1 is a block diagram of a prior art cross-polarization canceller.

Before describing the detail of the present invention, it is appropriate to describe a prior art digital demodulation system having a cross-polarization canceller with reference to FIG. 1. The prior art demodulation system generally comprises first- and second-channel receiving circuits 1 and 2 of identical configuration for respectively receiving through terminals 101 and 102 first- and second-channel intermediate frequency (IF) versions of digitally modulated radiowaves such as 16 or 64 QAM (quadrature amplitude modulation) signals which have been carried on orthogonally polarized planes, either vertical-horizontal orientation or clockwise-counterclockwise orientation.

Each of the receiving circuits 1 and 2 comprises a variable coupler 3, a digital demodulator 4 and a correlator 5. Each variable coupler 3 is formed by a subtracter 6 and a transversal filter 7. The subtracter 6-1 of the first receiving circuit 1 combines the IF version of the first-channel signal at terminal 101 with the IF version of the second-channel signal from terminal 102 which is proportioned in amplitude by transversal filter 7-1 in response to a control signal supplied from the correlator 5-1. Likewise, the subtracter 6-2 of the second receiving circuit 2 combines the IF version of the second-channel signal at terminal 102 with the IF version of the first-channel signal which is proportioned in amplitude by transversal filter 7-2 in response to a control signal supplied from the correlator 5-2. Digital demodulator 4-1 includes a quadrature demodulator that provides digital demodulation on the output of subtracter 3-1 to generate an output which is a replica of the original first-channel baseband N-level signal. Demodulator 4-1 further includes an (N+1)-bit analog-to-digital converter which converts the N-level analog signal into an (N+1)-bit signal by comparing it with predetermined thresholds. If the incoming signals are of 16 QAM format, the demodulated signal is a four-level signal which is converted into a 3-bit code and a 2-bit main data signal is derived from the higher significant 2-bits of the 3-bit code. This 2-bit main data signal is applied to an output terminal 103 and the most significant bit of the code is applied to the other correlator 5-2. The least significant bit of the 3-bit code represents an error component indicating the second-to-first channel cross-polarization interference, this LSB being applied to the own correlator 5-1. In a symmetrical manner, demodulator 4-2 derives a 2-bit main data signal from the higher significant bits of a 3-bit output and applied to an output terminal 104, the MSB of the 3-bit output being applied to the other correlator 5-1 as a data component and the LSB of the 3-bit output being applied to the own correlator 5-2 as an error component indicating the first-to-second channel cross-polarization interference. Each of the first- and second-channel correlators 5-1 and 5-2 detects the amount of correlation between the interfering component derived from the own channel signal and the data component derived from the demodulator of the other channel and generates a control signal that controls the tap weights of transversal filter 7 of the own channel to suppress the cross-polarization interference. Therefore, interference cancellation is provided by cross-coupled feedback operations.

One disadvantage of the prior art canceller, however, lies in the fact that, as a result of the cross-coupling between the two channels, a faulty condition in one of the two channels has caused a trouble or abnormality in the other channel. Another disadvantage is that, if the system is initially started only with one channel, the starting of the other channel at a later date will necessitate the initialization of the existing channel.

Figure 2:
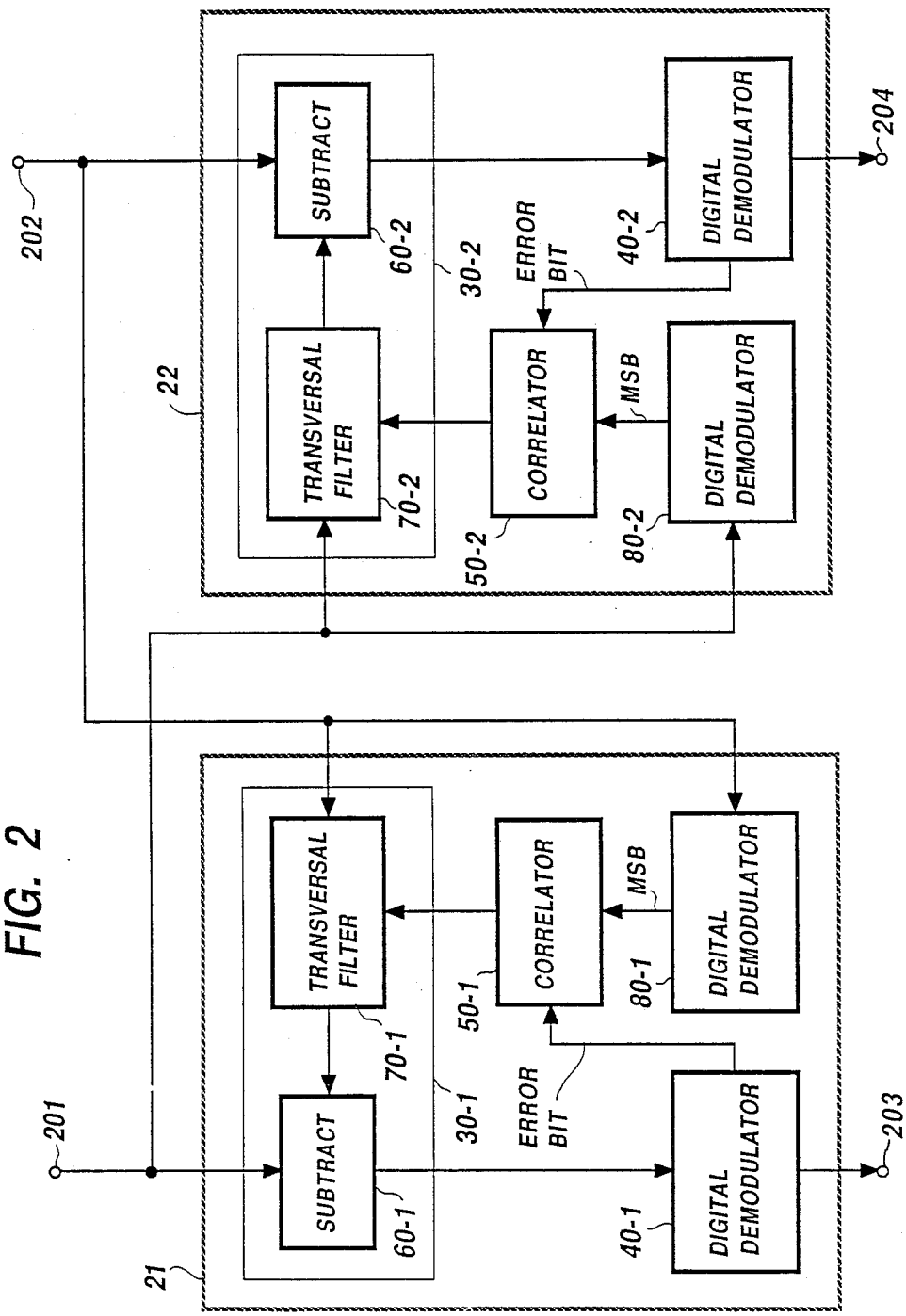
FIG. 2 is a block diagram of a cross-polarization canceller of the present invention.

Referring to FIG. 2, a demodulation system according to this invention is illustrated. Each of the first- and second-channel receiving circuits, designated 21 and 22 respectively, includes a variable coupler 30, a main digital demodulator 40, a correlator 50 and an auxiliary digital demodulator 80. Variable coupler 30 comprises a subtracter 60 and a transversal filter 70 whose output is connected to an input of the subtracter 60. The first-channel IF signal is applied through terminal 201 to the subtracter 60-1 of the own channel and to the transversal filter 70-2 and auxiliary demodulator 80-2 of the second-channel receiver 22, and likewise, the second-channel IF signal is applied through terminal 202 to the subtracter 60-2 of the own channel and to the transversal filter 70-1 and auxiliary demodulator 80-1.

Main demodulator 40-1 comprises a quadrature demodulator for demodulating the output of the subtracter 60-1 to derive an N-level analog signal and an (N+1)-bit analog-to-digital converter for deriving a main (N+1)-bit output from the N-level analog signal. An N-bit main data signal is taken from the N higher significant bits of the main (N+1)-bit output and supplied to an output terminal 203. The least significant bit of the main (N+1)-bit output is supplied to the correlator 50-1 as an error component indicating the second-to-first channel cross-polarization interference. Auxiliary demodulator 80-1 is identically constructed to the main demodulator 40-1 and demodulates the second-channel IF signal into an N-level analog signal and converts it into an auxiliary (N+1)-bit output and derives a data component of the second channel from the most significant bit of the auxiliary (N+1)-bit output, this main data component being supplied to the correlator 50-1.

In a similar manner, main demodulator 40-2 demodulates the output of the subtracter 60-2 to detect an N-level analog signal and derives a main (N+1)-bit output from the N-level analog signal. The N higher significant bits of the main (N+1)-bit output are supplied to an output terminal 204 and the least significant bit of the main (N+1)-bit output is supplied to the correlator 50-2 as an error component indicating the first-to-second channel cross-polarization interference. Auxiliary demodulator 80-2 is identically constructed to the main demodulator 40-2 and derives from the first-channel IF signal an auxiliary (N+1)-bit output and supplies the MSB of this output to the correlator 50-2 as a data component of the first channel.

Each of the first- and second-channel correlators 50-1 and 50-2 detects the amount of correlation between the interfering component derived from the own channel and the MSB component that is derived from the other channel through the auxiliary demodulator of the own channel and controls the tap weights of transversal filter 70 of the own channel so that the cross-polarization interference of interest is suppressed by the subtracter 60 and hence error-free multibit codes can be obtained at the output terminals 203 and 204.

Since the auxiliary demodulators 80 do not form part of the closed loop of the other channels, the problems mentioned earlier in connection with the prior part demodulation system can be eliminated.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A demodulation system for digital radio transmission in which first- and second-channel radio frequency (RF) digital signals are transmitted respectively on orthogonally polarized radiowaves and intermediate frequency (IF) versions of said first- and second-channel radio frequency signals are derived from said radio frequency digital signals, said system comprising:

variable coupling means for proportioning the IF version of said second-channel RF signal in response to a control signal applied thereto and subtractively combining the proportioned IF version of said second-channel RF signal with the IF version of said first-channel RF signal;

main digital demodulator means for demodulating an output of said variable coupling means to generate a main (N+1)-bit output and deriving an N-bit information signal as a data component of said first-channel RF signal from N higher significant bits of said main (N+1)-bit output and an error component of said first-channel RF signal from the least significant bit of the main (N+1)-bit output;

auxiliary digital demodulator means for demodulating the IF version of said second-channel RF signal to generate an auxiliary (N+1)-bit output and deriving a data component of said second-channel RF signal from the most significant bit of said auxiliary (N+1)-bit output; and means for determining a correlation between said error component and said data component and deriving therefrom said control signal.

2. A demodulation system as claimed in claim 1, further comprising:

second variable coupling means for proportioning the IF version of said first-channel RF signal in response to a second control signal applied thereto and subtractively combining the proportioned IF version of said first-channel RF signal with the IF version of said second-channel RF signal;

second main digital demodulator means for demodulating an output of said second variable coupling means to generate a second main (N+1)-bit output and deriving an N-bit information signal as a data component of said second-channel RF signal from N higher significant bits of said main (N+1)-bit output and an error component of said second-channel RF signal from the least significant bit of said second main (N+1)-bit output;

second auxiliary digital demodulator means for demodulating the IF version of said first-channel RF signal to generate a second auxiliary (N+1)-bit output and deriving a data component of said first-channel RF signal from the most significant bit of said second auxiliary (N+1)-bit output; and means for determining a correlation between said error component of said second-channel RF signal and said data component of said second-channel RF signal and deriving therefrom said second control signal.

3. A demodulation system for digital radio transmission in which first- and second-channel radio frequency (RF) digital signals are transmitted respectively on orthogonally polarized radiowaves and intermediate frequency (IF) versions of said first- and second-channel radio frequency signals are derived from said radio frequency digital signals, said system comprising:

variable coupling means for proportioning the IF version of said second-channel RF signal in response to a control signal applied thereto and signal with the IF version of said first-channel RF signal;

main digital demodulator means for demodulating an output of said variable coupling means to generate a main (N+1)-bit output and deriving an N-bit information signal as a data component of said first-channel RF signal from N higher significant bits of said main (N+1)-bit output;

auxiliary digital demodulator means for demodulating the IF version of said second-channel RF signal to generate an auxiliary (N+1)-bit output; and means for deriving a data component of said second-channel RF signal from the most significant bit of said auxiliary (N+1)-bit outputs, deriving an error component of said first-channel RF signal from the least significant bit of said main (N+1)-bit outputs, determining a correlation between said error component and said data component, and deriving said control signal from the determined correlation.

4. A demodulation system as claimed in claim 3, further comprising:

second variable coupling means for proportioning the IF version of said first-channel RF signal in response to a second control signal applied thereto and subtractively combining the proportioned IF version of said first-channel RF signal with the IF version of said second-channel RF signal;

second main digital demodulator means for demodulating an output of said second variable coupling means to generate a second main (N+1)-bit output and deriving an N-bit information signal as a data component of said second-channel RF signal from N higher significant bits of said second main (N+1)-bit output;

second auxiliary digital demodulator means for demodulating the IF version of said first-channel RF signal to generate a second auxiliary (N+1)-bit output; and means for deriving a data component of said first-channel RF signal from the most significant bit of said second auxiliary (N+1)-bit outputs, deriving an error component of said second-channel RF signal from the least significant bit of said main (N+1)-bit outputs, determining a correlation between said error component of said second-channel RF signal and said data component of said second-channel RF signal, and deriving said second control signal from the determined correlation between the last-mentioned error and data components.

* * * * *